Patented May 25, 1954

2,679,500

UNITED STATES PATENT OFFICE 2,679,500

SUBSTITUTED M-THIAZANE-4-ONES

Virgil W. Gash, Champaign, Ill., and Keith W. Wheeler, Wyoming, Ohio, assignors to The Wm. S. Merrell Company, Cincinnati, Ohio, a corporation of Delaware No Drawing. Application October 16, 1951, Serial No. 251,640

1 Claim. (Cl. 260—243)

This invention relates to new chemical compounds which are useful as central depressants.

The new compounds of the invention are 5 or 6 or 5,6-substituted derivatives of tetrahydro-m-thiazane-4-ones, in which 1, 2, 3 or 4 of the hydrogen atoms in the 5- or 6-positions is or are replaced by hydrocarbon or substituted hydrocarbon groups, including lower alkyl, phenyl, lower phenyl alkyl, lower alkyl phenyl, halophenyl and lower cycloalkyl groups, which, if there is more than one such substituent, may be the same or different, in which the 2-carbon atom is linked to a lower alkylimino radical and in which the nitrogen atom in the 3-position is linked to a lower alkyl radical. The compounds may be used as such, although they may also be used in the form of their salts, such as the hydrobromides or hydrochlorides.

The new compounds may be represented by the generic formula:

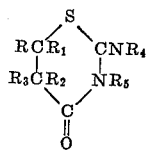

in which R, $R_1$, $R_2$ and $R_3$ represent hydrogen or lower alkyl, phenyl, lower phenyl alkyl, lower alkyl phenyl, halophenyl or lower cycloalkyl groups, with the requirement that at least one of the four is not hydrogen, $R_4$ represents lower alkyl and $R_5$ represents lower alkyl.

These new chemical compounds are central nervous system depressants, pharmacologically similar to the barbiturates. The new compounds are among other things useful as hypnotics, sedatives and injectable anesthetics. They are also useful for antidoting and preventing convulsant manifestations.

In general, for therapeutic purposes, the compounds are administered orally, either as the free acids, or in the form of a salt. They may be administered by other routes as by injection, rectal suppository and the like, in which case they are used in the form of the water soluble salts.

The new compounds of the invention may be prepared by the condensation of substituted beta-bromopropionic acids with substituted thioureas in accordance with the-following type equation:

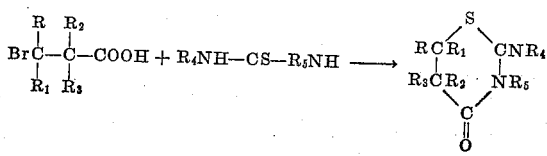

The invention will be further illustrated by the following specific examples giving detailed directions for the preparation of several of the compounds.

Example I

A solution of 22 g. sym.-dimethylthiourea and 33 g. 3-bromobutyric acid in 200 ml. absolute ethanol was refluxed for 4.5 hours. The alcohol was distilled off under vacuum, leaving a light yellow viscous oil. To this oil was added 25 ml. acetic anhydride and the solution was then heated on the steam bath for 5 hours. The solution was cooled, diluted with ether and chilled. There was soon deposited a solid which was removed, broken up and washed with ether. This solid was then recrystallized twice from mixtures of absolute ethanol and ether to give 15 g. white crystals, decomposing at 211–12°, and consisting of the hydrobromide of 3,6-dimethyl-2-methyliminotetrahydro-m-thiazane-4-one.

|  | C | H | N | Br |
|---|---|---|---|---|
| Calcd. for $C_7H_{12}ON_2S \cdot HBr$ | 33.21 | 5.18 | 11.07 | 31.57 |
| Found | 33.19 | 5.28 | 10.47 | 32.08 |

When this hydrobromide is dissolved in water and the solution is neutralized to pH 7 there is obtained an oil which solidifies, when chilled, to the free base, M. P. 39–41°.

Example II

A mixture of 70 g. 3-bromo-2-methyl-3-phenylpropionic acid, 30.8 g. sym.-dimethylthiourea and 150 ml. glacial acetic acid, after standing at room temperature for three days was heated and stirred at 90° for four hours. One hundred milliliters of acetic anhydride was added and the stirred mixture was then heated on the steam bath for three hours. Acetic acid was removed under vacuum and ether was added to the residue, which soon crystallized. The crystalline material was collected and recrystallized from absolute ethanol to give 58 g. (61% yield) of the hydrobromide of 3,5-dimethyl-2-methylimino-6-phenyltetrahydro-m-thiazane-4-one, M. P. 213–14.5° (decomposition).

|  | C | H | N | S | Br |
|---|---|---|---|---|---|
| Calcd. for $C_{13}H_{16}ON_2S \cdot HBr$ | 47.42 | 5.21 | 8.51 | 9.72 | 24.27 |
| Found | 47.57 | 5.50 | 9.22 | 9.69 | 24.20 |

If the hydrobromide is dissolved in water and the solution neutralized with sodium bicarbonate there is obtained the free base, melting at 68–70.5°.

The hydrobromide of this compound is soluble in water to the extent of about 9%.

*Example III*

A solution of 25.7 g. 3-bromo-2-ethyl-3-phenylpropionic acid and 10.4 g. sym.-dimethylthiourea in 75 ml. absolute ethanol was refluxed for 24 hours. The alcohol was removed at the water pump and 25 ml. acetic anhydride was added to the residue. This solution was heated on the steam bath for four hours. The solution was diluted with ether and a little methanol and chilled, giving white crystals of the hydrobromide of 5-ethyl-2-methylimino-3-methyl-6-phenyl-tetrahydro-m-thiazane-4-one, melting with decomposition at 224–4.5°. The hydrobromide is soluble 1 part in 60 in water.

|  | C | H | Br |
|---|---|---|---|
| Calcd. for $C_{14}H_{18}ON_2S \cdot HBr$ | 49.0 | 5.58 | 23.29 |
| Found | 49.47 | 5.83 | 23.82 |

Neutralization of an aqueous solution of the hydrobromide gives the free base, M. P. 67.5–9°.

|  | C | H | N | S |
|---|---|---|---|---|
| Calcd. for $C_{14}H_{18}ON_2S$ | 64.09 | 6.91 | 10.68 | 12.22 |
| Found | 64.04 | 6.75 | 10.50 | 12.7 |

*Example IV*

A solution of 68 g. 3-bromo-2-isopropyl-3-phenylpropionic acid and 32 g. sym.-dimethylthiourea in 300 ml. acetic acid was heated at 80–90° for 48 hours. Then 57 ml. acetic anhydride was added and the solution was again heated another 48 hours at the same temperature. After removal of the solvent under vacuum, treatment of the residue with ether and water left as a crystalline residue the relatively insoluble hydrobromide of 2-methylimino-3-methyl-5-isopropyl-6-phenyltetrahydro-m-thiazane-4-one, M. P. 209–11° (decomposition), after recrystallization from a mixture of absolute ethanol and petroleum ether.

|  | C | H | N |
|---|---|---|---|
| Calcd. for $C_{15}H_{20}ON_2S \cdot HBr$ | 50.41 | 5.92 | 7.84 |
| Found | 50.05 | 6.12 | 7.73 |

*Example V*

The condensation procedure given in Example II was repeated, using 28 g. 2-benzyl-3-bromo-3-phenylpropionic acid, 10.4 g. sym.-dimethylthiourea and 60 ml. acetic acid. After treating with 45 ml. acetic anhydride the solution was heated three hours by steam. Acetic acid was removed under vacuum and the residue was treated with ether and water. Neutralization of the separated aqueous solution gave white crystals of 5-benzyl-2-methylimino-3-methyl-6-phenyltetrahydro-m-thiazane-4-one, M. P. 83.5–85° after recrystallization from a mixture of ether and ethanol. Treatment of an ether solution of this compound with gaseous HBr gave the hydrobromide as a white powder, M. P. 165–75° or 183–90° depending on which solvent it is crystallized from. It is apparently a mixture of stereoisomers.

|  | C | H | N | S |
|---|---|---|---|---|
| Calcd. for $C_{19}H_{20}ON_2S \cdot HBr$ | 56.29 | 5.22 | 6.91 | 7.91 |
| Found | 56.08 | 5.34 | 7.45 | 8.10 |
|  | 56.32 | 5.16 |  |  |

*Example VI*

A mixture of 29.1 g. 3-bromo-3-p-chlorophenyl-2-ethylpropionic acid and 10.4 g. sym.-dimethylthiourea in 100 ml. acetic acid was treated as in Example IV, but heated for a shorter period of time. Treating the cold reaction mixture with successive small portions of anhydrous ether caused precipitation of the hydrobromide of 6-p-chlorophenyl-5-ethyl-2-methylimino-3-methyltetrahydro-m-thiazane-4-one, M. P. 213–14° (decomposition) after crystallization from a mixture of benzene and absolute ethanol.

|  | C | H | N |
|---|---|---|---|
| Calcd. for $C_{14}H_{17}ON_2SCl \cdot HBr$ | 44.52 | 4.80 | 7.42 |
| Found | 44.61 | 5.05 | 7.30 |
|  | 44.71 | 5.03 | 7.40 |

*Example VII*

Condensing 20 g. 3-bromo-2-cyclohexyl-3-phenylpropionic acid and 7 g. sym.-dimethylthiourea as in the preceding example gave 11 g. of the hydrobromide of 5-cyclohexyl-2-methylimino - 3 - methyl - 6 - phenyltetrahydro-m-thiazane-4-one, M. P. 223–4° (decomposition) after several recrystallizations from mixtures of absolute ethanol and ether or butanone.

|  | C | H | N | Br |
|---|---|---|---|---|
| Calcd. for $C_{18}H_{24}ON_2S \cdot HBr$ | 54.41 | 6.34 | 7.05 | 20.11 |
| Found | 54.34 | 6.35 | 6.48 | 20.26 |
|  | 54.55 | 6.32 | 6.56 |  |

*Example VIII*

Repeating the procedure of Example IV with 47.5 g. 3-bromo-2-phenylbutyric acid and 24 g. sym.-dimethylthiourea gave 2-methylimino-3,6-dimethyl - 5 - phenyltetrahydro - m - thiazane-4-one, M. P. 72–86°, after recrystallization several times from petroleum ether and from aqueous ethanol.

|  | C | H | N |
|---|---|---|---|
| Calcd. for $C_{13}H_{16}ON_2S$ | 62.87 | 6.50 | 11.30 |
| Found | 63.03 | 6.67 | 11.33 |

*Example IX*

Repeating the same procedure with 25 g. 3-bromo-2-phenylpentanoic acid and 10. g. sym.-dimethylthiourea gave a small yield of 6-ethyl-2 - methylimino - 3 - methyl - 5 - phenyltetrahydro-m-thiazane-4-one, M. P. 80–2° after crystallization from aqueous alcohol and then petroleum ether.

|  | C | H | N |
|---|---|---|---|
| Calcd. for $C_{14}H_{18}ON_2S$ | 64.10 | 6.91 | 10.68 |
| Found | 64.48 | 6.93 | 10.42 |
|  | 64.68 | 6.98 | 10.44 |

Example X

Using a procedure similar to those given above, but using 45 g. 3-bromo-2,3-diethylpentanoic acid, 24 g. sym-dimethylthiourea, and 300 ml. acetic acid, gave, after neutralizing the aqueous extract of the reaction mixture, 2-methylimino-3-methyl-5,6,6-triethyltetrahydro-m-thiazane-4-one, M. P. 75–7° after two recrystallizations from petroleum ether. This material is soluble to the extent of about 13% in the calculated amount of hydrochloric acid.

|  | C | H | N |
|---|---|---|---|
| Calcd. for $C_{12}H_{22}ON_2S$ | 59.47 | 9.15 | 11.58 |
| Found | 59.20 | 9.20 | 11.23 |

Example XI

A solution of 47 g. of 3-bromo-2,2-diphenylpropionic acid and 18.7 g. sym.-dimethylthiourea in 300 ml. acetic acid and 75 ml. methyl isobutyl ketone (to increase the solubility of the bromo acid) was heated at 50° for four hours and 70–80° for about 32 hours. Then 35 ml. acetic anhydride was added and the solution was heated at 80° for 24 hours and 100° for 24 hours. The solvents were removed under vacuum, and the residue was treated with water and ether. The aqueous solution was neutralized with sodium bicarbonate and the oil which separated crystallized upon being cooled and scratched with a glass rod. This material was recrystallized twice from mixtures of alcohol-petroleum ether, the second time with charcoal treatment, to give white crystals of 2-methylimino-3-methyl-5,5-diphenyltetrahydro-m-thiazane-4-one, M. P. 115.5–17°.

|  | C | H | N |
|---|---|---|---|
| Calcd. for $C_{18}H_{18}ON_2S$ | 69.63 | 5.84 | 9.03 |
| Found | 69.56 | 5.85 | 8.91 |

As can be seen from the examples, one general procedure has been used for preparing all of these compounds. This consists of condensing a 3-bromo acid with a substituted thiourea by heating in a solvent, then adding acetic anhydride to insure ring closure of the intermediate to give the 2-imino derivative. Conditions for carrying out this condensation and cyclization step may be varied widely as to temperature and time, as is seen from the examples.

The 3-bromo acids in general can be prepared by the procedure of treating an α,β-unsaturated acid with fuming hydrobromic acid in a pressure bottle at temperatures anywhere between 25° and 100°. Some of the unsaturated acids do not require pressure for the addition of HBr but most of them do. The bromo acids are recovered by diluting the reaction mixture with ice water. If the product separates in crystalline form, it is filtered, washed and dried and may generally be used without further purification. If the product separates in a gummy condition, it is taken up in ether, the ether solution is washed, dried, and evaporated and the residue is recrystallized from a suitable solvent such as 75–90° petroleum ether. A number of the required bromo acids are known. Following is a list of bromo acids used to prepare some of the compounds of the examples, and which we believe not to have been described in the chemical literature before:

3-bromo-3-phenyl-2-isopropylpropionic, M. P. 163–4°.

3-bromo-3-phenyl-2-benzylpropionic, M. P. 195.5–6.5°.

3-bromo-2-ethyl-3-(p-chlorophenyl) propionic, M. P. 147°.

3-bromo-3-phenyl-2-cyclohexylpropionic, M. P. 188–90°.

3-bromo-2-phenylbutyric, M. P. 105–8°.

3-bromo-2-phenylvaleric, M. P. 120–4°.

3-bromo-2,3-diethylpentanoic, M. P. 65–7°.

The physical constants of the bromo acids listed here are those of the compounds actually used, and not necessarily of an analytically pure sample of the compound.

Bromo acids for the 5,5-disubstituted compounds, of course, can not be prepared by this same method. 3-bromo-2,2-diphenylpropionic acid was prepared by condensation of benzene with bromopyruvic acid, according to the method of Wegmann and Dahn, Helv. Chim. Acta 29, 415–32 (1946). The corresponding 3-bromo-2,2-diethylpropionic acid, as well as other 2,2-dialkyl analogs, may be prepared by treating the corresponding 3-hydroxy compound with fuming hydrobromic acid, or with PBr3, or by other known methods for converting the primary hydroxyl groups to a bromine group. The 3-hydroxy-2,2-diethylpropionic acid is prepared by the method of Ludwig, J. Am. Chem. Soc. 72, 5329 (1950). Bromo acids from this process can be used to prepare other 5,5-disubstituted compounds, such as the 5,5-dimethyl-, 5-5-diethyl-, and 5-butyl-5-ethyl-tetrahydro-m-thiazane-4-ones, for example.

As will be apparent to those skilled in the art, various modifications can be made in the procedures of the specific examples by way of choice of initial reactants to provide other compounds which fall within the scope of the present invention and in which R's in the 5- and 6-positions can be, for example, n-butyl, n-amyl, beta-phenylethyl, o-tolyl, m-tolyl, p-tolyl, xylyl, p-ethylphenyl, o-bromophenyl, m-bromophenyl, p-bromophenyl, cyclobutyl, cyclopentyl, and so forth, and in which R4 or R5 can be, for example, ethyl, isopropyl, n-propyl, n-butyl, secondary butyl, n-amyl, and so forth.

We claim:

The compounds of the generic formula in which

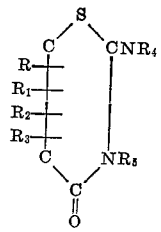

R, R1 and R2 are substituents selected from the group consisting of hydrogen, lower alkyl, phenyl, lower phenyl alkyl, halophenyl and cycloalkyl groups, R3 is a substituent selected from the group consisting of lower alkyl, phenyl, lower phenyl alkyl, halophenyl and cycloalkyl groups, and R4 and R5 are lower alkyl radicals, said halogen of said halophenyl groups having an atomic number from 35 to 80, said cycloalkyl groups having from 4 to 6 carbon atoms, and said lower alkyl radicals having up to 3 carbon atoms.

References Cited in the file of this patent

Bougalt et al., Compt. rend. (Fr. Acad.) vol. 224, pp. 656–7 (1947).